Figure 1:
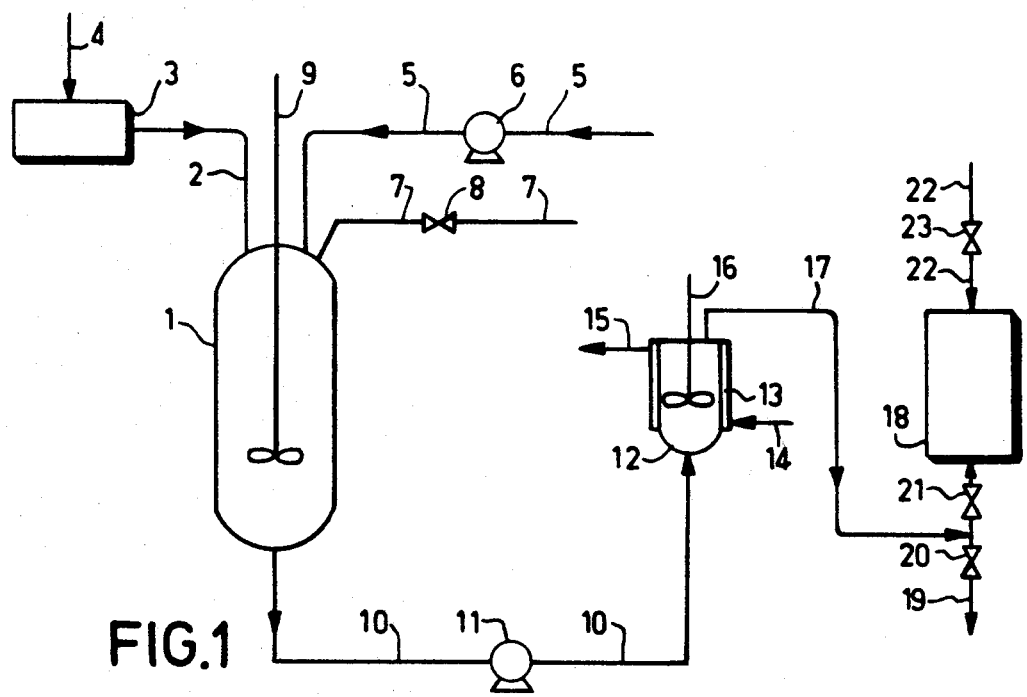

United States Patent [19]

Claude et al.

[11] 4,250,227

[45] Feb. 10, 1981

[54] MICRON SIZE POLYMERIC COATING AND RELATED METHODS

[75] Inventors: Bruno Claude; Richard Le Fustec, both of Le Havre, France

[73] Assignee: Compagnie Francaise de Raffinage, Paris, France

[21] Appl. No.: 890,531

[22] Filed: Mar. 27, 1978

[30] Foreign Application Priority Data

Apr. 6, 1977 [FR] France .................................. 77 10398

[51] Int. Cl.³ ........................ B32B 27/08; B05D 3/02; B32B 15/08; B32B 27/00
[52] U.S. Cl. .................................... 428/461; 156/327; 156/334; 427/195; 427/379; 427/388.5; 427/393.5; 427/398.3; 427/409; 428/156; 525/310
[58] Field of Search ............... 260/33.6 PQ, 33.6 UA; 427/385 R, 379, 388 D, 398 B, 195, 409, 388.5, 398.3, 393.5; 428/461, 516; 156/334, 327; 525/310

[56] References Cited

FOREIGN PATENT DOCUMENTS 571814 9/1945 United Kingdom ...................... 260/33.6
1135221 12/1968 United Kingdom ...................... 260/33.6
1131303 10/1968 United Kingdom ...................... 260/33.6

OTHER PUBLICATIONS

Cheng, Tze et al., *Plastics World*, Jan. 1968, pp. 28 et seq.
McSharry, James J. et al., *La Polyvalence des Dispersions Depolyethylene, Plastiques Modernes et Elastameres*, Apr. 1968, pp. 71-75, 115.

*Primary Examiner*—Michael R. Lusignan
*Attorney, Agent, or Firm*—Curtis, Morris & Safford

[57] ABSTRACT

Process for, and composites made by, coating a polymer layer onto a support, obtained by quenching a solution of the polymer to form a polymer suspension, by spreading the suspension on the support, and thereafter eliminating the solvent. The resulting coating of polymer preferably may thereafter be fused. Application of said process to the production also composites comprising an aluminum film and a film thermally bonded to said support by a thin intermediate layer of a copolymer formed of acrylic acid grafted with polyethylene or polypropylene, said layer having been applied by the foregoing process.

30 Claims, 3 Drawing Figures

MICRON SIZE POLYMERIC COATING AND RELATED METHODS

The present invention relates to a process for coating a support with a layer of polymer by the use of a suspension of said polymer, and to applications for said process.

Hereinafter, "polymer layer" means either a continuous film or a layer formed of discrete particles;

"polymer suspension" means a suspension of a polymer in an organic liquid, said suspension being obtained by the rapid cooling of a solution of said polymer; and "support" means any material which it may be desirable to coat with a polymer film, as, for example, metals, other polymers, textiles, glass, paper, etc. The support may be a film of aluminum, for example, or of polyethylene or polypropylene.

The use of dispersions of powders of polymers in the coating of supports is known. Articles in which such uses are described have been published by Tze Cheng and Memering in PLASTICS WORLD for January, 1968 (pp. 28 et seq.) and by McSharry, Howell and Memering in PLASTIQUES MODERNES ET ELASTOMERES, April, 1968 (pp. 71 et seq.). Such dispersions are obtained from polyethylene powders of a particle size of not less than 8 microns and as much as 30 microns, the polyethylene powder being dispersed in water or in an organic compound. A variety of supports—paper, metals or textiles—may be coated with dispersions. The article which appeared in PLASTICS WORLD states that the thickness of the polyethylene film on a metal support coated with such suspensions is of the the order of one thousandth of an inch, that is to say, about 25 microns.

Even though the particle size of the polyethylene contained in these dispersions may be small, the applicants have found that it is preferable to use a suspension of polymer in an organic liquid obtained by rapid cooling of a solution of said polymer. In fact, the use of such suspensions makes it possible to obtain a layer of polymer on the support that is very thin, in the neighborhood of one micron. Such use therefore leads to savings in raw materials.

The applicants have further observed that when such suspensions are used, the layer of polymer with which the support is being coated will already adhere to the support after evaporation of the organic liquid and before the polymer has fused. This cannot be achieved with the dispersions described in the articles mentioned. Moreover, the use of these suspensions makes it possible to obtain a uniform and continuous film, after the polymer has fused, though the film is very thin and this, too, cannot be achieved with dispersions where the particle size of the polymer ranges from 8 to 30 microns.

It is known in the prior art to prepare polymer powders by rapidly cooling a solution of the polymer. Such cooling, also known as quenching, is described in French Pat. No. 945,962. The polymer suspensions which may be used in accordance with the present invention are obtained by this prior-art process of preparation, as will be seen further on. Such suspensions are highly suited to the coating of supports; moreover, they are stable and do not require the use of a surface-active agent.

The purpose of the present invention thus is the coating of supports with a layer of polymer.

The invention therefore has as a preferred embodiment a process for the coating of a support with a polymer layer, said process comprising:

(a) The preparation of a suspension of polymer in an organic liquid, (b) the coating of the support with said polymer suspension, and (c) the elimination of the organic liquid; said process being characterized by the fact that the polymer suspension is obtained by quenching a solution of said polymer.

The step of elimination of the organic liquid may advantageously be followed by a step of fusing the polymer so as to obtain a continuous layer of polymer on the support.

The supports covered with a layer of polymer obtained by the process in accordance with the invention, and applications for these particular supports, represent further embodiments of the invention.

In preparing polymer suspensions suited for use in the process in accordance with the invention, the applicants have used both low- and high-density polyethylene. They have also used graft copolymers obtained by polymerization of ethylene or propylene and grafting of a small amount of an unsaturated monoethylenic carboxylic acid, such as acrylic acid or methacrylic acid. Such grafting may be effected by extrusion of a polymer powder to which the carboxylic acid has been added, said powder having previously been irradiated in an electron accelerator.

The polymer suspensions suited for use in the process in accordance with the invention may be suspensions of polymers in organic liquids which are generally used as solvents of homopolymers or copolymers of ethylene and propylene, particularly hydrocarbons such as paraffinic or cycloparaffinic hydrocarbons, and especially hexane, cyclohexane, isoctane, etc.

The concentration of the polymer in the suspension will depend on the polymer and on the organic liquid used. Thus, when the organic liquid is cyclohexane and the polymer is high-density polyethylene, whether or not grafted with acrylic acid, the polymer concentration is preferably less than 8 wt.%, and better yet less than 5 wt.%. In fact, the applicants have observed that above this limit of 8% the suspension is no longer homogeneous, the suspensions having tendency to agglomerate, which is detrimental to its use in coating. For other polymer/organic liquid pairings, the concentration limit may be under or over 8 wt.%. Thus, in the case of polypropylene, on which acrylic acid has been grafted, the concentration limit is preferably less than 5 wt.%.

The suspensions which may be used in the process in accordance with the invention are obtained by quenching a polymer solution. The applicants have found that to obtain polymer suspensions suitable for use in the process in accordance with the invention it is necessary that during the quench the temperature of the solution be rapidly reduced to a level which will depend on the polymer and on the solvent used. The temperature of the solution before the quench is not critical and should be sufficiently high for the polymer to dissolve in the solvent.

In the case of low-density or high-density polyethylene, whether or not grafted with acrylic acid, and of cyclohexane, it is preferably that the temperature of the quench, and hence of precipitation, be 50° C. or less.

In the case of polypropylene that has been grafted with acrylic acid, it is preferably that the quenching temperature be 40° C. or less.

The use of polymer suspensions prepared by quenching polymer solutions makes it possible to obtain on a support a polymer layer about one micron thick. The applicants believe that this is due to the fact that the average size of the polymer particles contained in the suspension is very small. When observing previously dried particles of polyethylene, whether or not grafted with acrylic acid, under the electron microscope, the applicants found that the size of these particles was under 8 microns and may have been about 2 microns.

The applicants have observed that when the temperature of the quench is too high, the size of the particles is larger and that the regularity of the polymer layer is bad.

Coating of the support may be effected by means known in the art. It may, for example, be effected by applying a film with a transfer roller.

The organic liquid contained in the suspension must then be eliminated from the coated support by drying the latter, as by heating in a heating tunnel, for example.

After the organic liquid has been eliminated, the polymer layer with which the support has thus been coated will be about one micron thick. If the support has been heated to a temperature sufficiently high for the polymer to fuse, the layer will be continuous.

For polyethylene and polypropylene, that temperature should be about 150° and 180° C., respectively. In the case of a metal film coated with polymer, fusing of the polymer layer may be obtained by calendering the film on a cylinder heated to a sufficiently high temperature.

The process in accordance with the invention makes it possible to coat a wide variety of supports, such as metals, other polymers, glass, paper and fabrics.

It may, in general, be employed to coat supports with an impervious protective film, as, for example, in the packaging industry or in the mechanical industry.

It may also be used to coat glass containers with a polyethylene film, for example, so as to contain the glass fragments when the container is accidentally broken.

When the polymer may be used as an adhesive, for example, in the case of a polyethylene or polypropylene on which acrylic acid has been grafted, it may serve to bond an aluminum film to a polyethylene or polypropylene film. This is of particular interest so far as graft polypropylene is concerned as it has not been possible up to now to prepare films of graft polypropylene capable of being bonded to aluminum since polypropylene is degraded during irradiation prior to grafting with acrylic acid. In the case of graft polyethylene, the cost of the composite obtained is very low since the layer of graft polyethylene is very thin. Moreover, such graft polymers used as adhesives offer the advantage of being approved for use in the food industry.

Supports formed of an aluminum film coated with a layer of graft polymer, and composites formed of such supports to which a polymer film has been bonded, may be used in particular in the manufacture of stopper caps for containers such as milk bottles.

In this specification and the accompanying drawings we have shown and described a preferred embodiment of our invention and have suggested various alternatives and modifications thereof; but it is to be understood that these are not intended to be exhaustive and that many other changes and modifications can be made within the scope of the invention. These suggestions herein are selected and included for purposes of illustration in order that others skilled in the art will more fully understand the invention and the principles thereof and will thus be enabled to modify it and embody it in a variety of forms, each as may be best suited to the conditions of a particular use.

Figure 3:
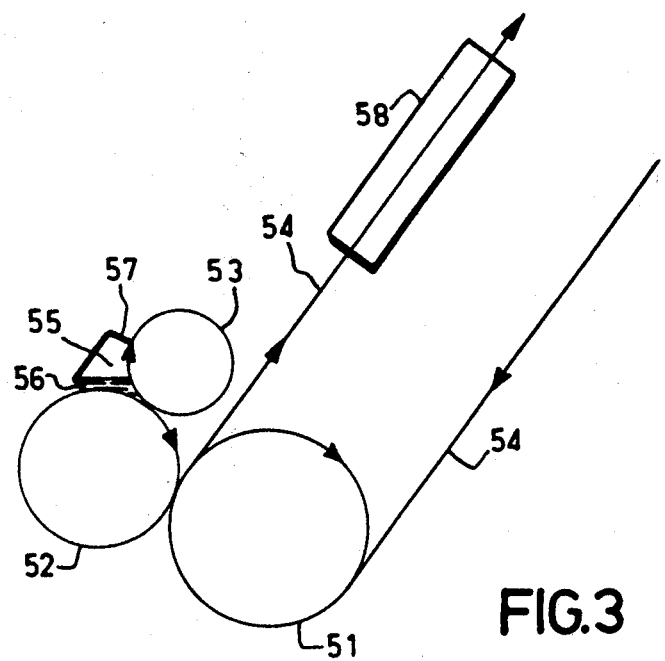
Figure 2:
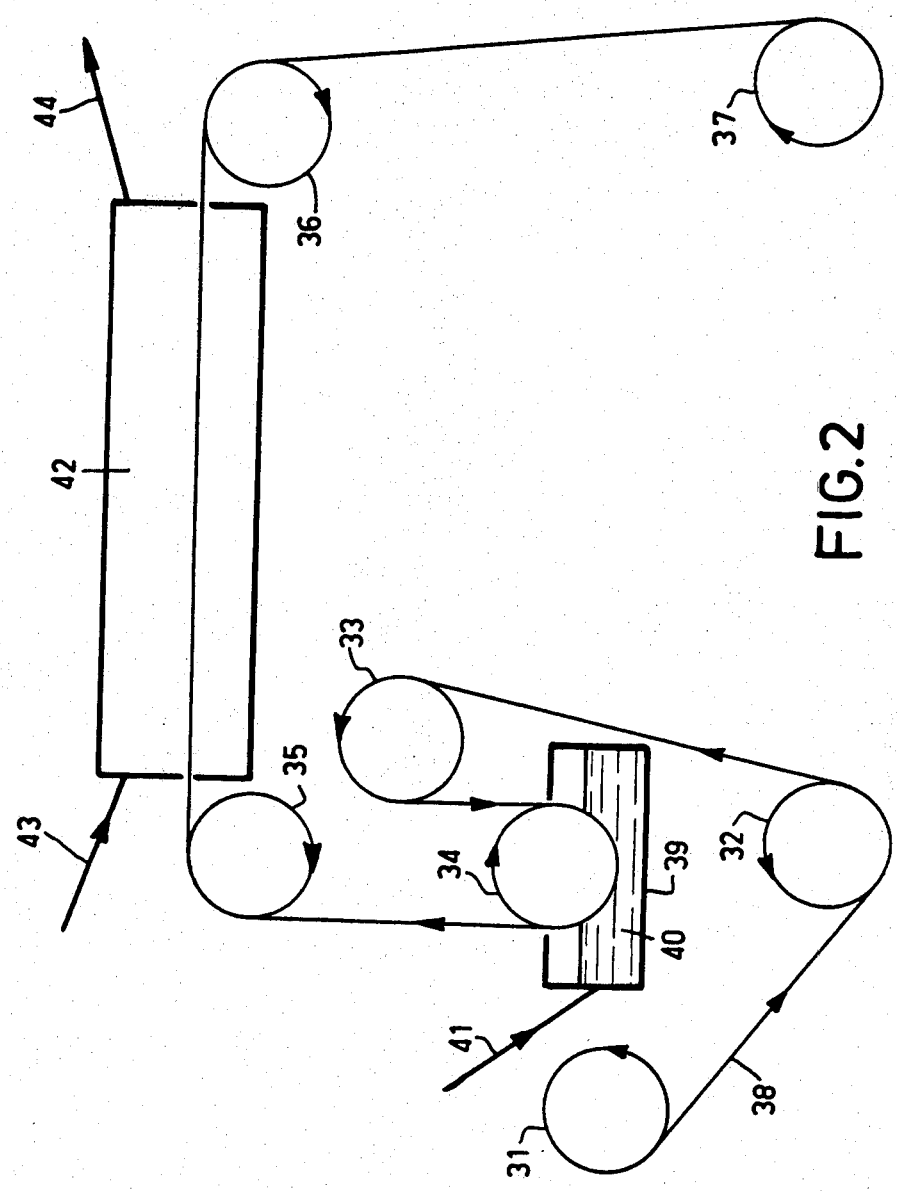

In the accompanying drawings:

FIG. 1 is a simplified diagram of an apparatus for the preparation of suspensions of polymers suited for use in the process in accordance with the invention, and FIGS. 2 and 3 are simplified diagrams of apparatus for the coating of supports in accordance with the process of the invention when the support is a metallic film, for example.

Referring now to FIG. 1, a dissolving tank in which the polymer solution is prepared is designated by 1. The polymer is introduced into tank 1 in the fused stated through line 2. The polymer comes from an extruder 3 to which the polymer is fed through line 4. The solvent enters the tank 1 through line 5 in which a pump 6 is disposed.

Tank 1 is provided with heating means (not shown) whereby a temperature sufficiently high to dissolve the polymer can be maintained within the tank. An inert atmosphere is maintained in the tank by introducing an inert gas, such as nitrogen, through line 7, which is provided with a valve 8.

The pressure and the temperature inside the tank will depend on the polymer and on the solvent used. When the polymer is high-density polyethylene and the solvent is cyclohexane, the temperature may be about 140° C. and the pressure 8 bars absolute.

The tank 1 is provided with an agitator 9.

The polymer solution is collected through line 10, which is provided with a pump 11. The solution is piped through line 10 to a precipitation tank 12. The temperature inside tank 12 is very much lower than in the interior of tank 1. In the case mentioned earlier where the solvent is cyclohexane and the polymer is high-density polyethylene, the temperature may be about 40° C., the pressure being substantially the same.

This lower temperature may be obtained through the circulation of water in the double jacket 13, for example, which the water enters through line 14 and leaves through line 15.

The tank 12 is provided with an agitator 16.

The suspension formed in tank 12 is piped through line 17 into a storage tank 18 or directly to the coating station.

The suspension may be drawn off through line 19 by means of valves 20 and 21. An inert-gas atmosphere may be maintained in the tank 18, the gas being introduced through line 22, which is provided with a valve 23.

With reference to FIG. 2, the apparatus for the coating of a support comprises seven cylinders 31, 32, 33, 34, 35, 36 and 37 which rotate in the direction of the arrows. These cylinders are at ambient temperature.

The support 38 to be coated, here on aluminum film, is disposed on cylinder 31. It unwinds from that cylinder and passes over cylinders 32 and 33 and then over cylinder 34. The latter dips into the polymer suspension 40 contained in a vat 39. Vat 39 is supplied with suspension through line 41. The support that has been coated with the suspension passes over a cylinder 35 and then through a drying tunnel 42 in which a current of hot gas, introduced through line 43, circulates. The temperature in the interior of tunnel 42 is about 80° C. The gas containing the evaporated solvent is evacuated through line 44. The evaporated solvent may be recovered by condensation in a device which is not shown.

At the outlet of tunnel 42, the support 38 passes over a cylinder 36 and is rewound onto a cylinder 37. The fusion of the polymer layer with which the film 38 is covered may be secured by calendering the film 38 on a cylinder heated to 200° C.

In the case of FIG. 3, the apparatus for the coating of a support comprises three cylinders 51, 52 and 53 which rotate in the direction indicated by the arrows. The support 54, for example, an aluminum film, passes between the cylinders 51 and 52. The polymer suspension contained in the tank 55 is applied by cylinder 52 to the support 54. The spacing between cylinders 51 and 52 on the one hand and 53 and 52 on the other hand may be adjusted according to the support to be coated and to the desired thickness of the polymer on said support.

The cylinders 52 and 53 are provided with wiper blades 56 and 57. The cylinders 51, 52 and 53 are at ambient temperature.

After it has been coated with the suspension, the support 54 passes through a drying tunnel where the temperature is about 80° C.

For the sake of simplicity, the film feed and takeup cylinders are not shown.

The examples which follow, which in no way represent a limitation of the invention, relate to:

the preparation of suspensions of polymers suited for use in the process in accordance with the invention;

the coating of supports by the use of these suspensions; and an application for the supports so coated with a layer of polymer.

EXAMPLE 1

This example relates to the preparation of suspensions in an apparatus such as the one shown in FIG. 1 as well as to stability tests performed on some of the prepared suspensions.

PREPARATION OF SUSPENSIONS

Suspensions have been prepared by the use of four polymers, A, B, C and D.

Polymer A is a high-density polyethylene of molecular weights $\overline{Mw}$ 130,000 and $\overline{Mn}$ 15,000, whose density is 0.96.

Polymer B is a low-density polyethylene of molecular weights $\overline{Mw}$ 400,000 and $\overline{Mn}$ 20,000, whose density is 0.918.

Polymer C is the high-density polyethylene A containing, grafted, 0.5 wt. % of acrylic acid.

Polymer D is a polypropylene having a fluidity index of 6 (measured in accordance with ASTM standard D 1238, conditions L) containing, grafted, 0.5 wt. % of acrylic acid.

The grafting of the acrylic acid was effected, in the case of polymers C and D, after the starting polymers had been irradiated in an electron accelerator.

During preparation, the temperature and pressure in tank 1 were 140° C. and 8 bars absolute, respectively, in the case of polymers A, B and C, and 160° C. and 8 bars absolute, respectively, in the case of polymer D. In all these cases the pressure in tank 12 was 8 bars absolute.

The temperature in tank 12 was varied, as was the concentration of the polymer solutions and hence of the suspensions. The size of the polymer particles in the suspensions was then observed under the electron microscope after the particles had been dried.

The test conditions and results are given in the table which follows.

TABLE 1

| Polymer | Test No. | Solvent | Temperature in tank 12, °C. | Concentration of suspension, wt. % | Average particle size observed in suspension |
|---|---|---|---|---|---|
| A | A1 | Cyclohexane | 40 | 2.5 | <8 |
| B | B1 | — | 40 | 2.5 | <8 |
| C | C1 | — | 20 | 1.25 | 3 |
|   | C2 | — | 30 | 1.25 | 3 |
|   | C3 | — | 40 | 1.25 | 2 |
|   | C4 | — | 50 | 1.25 | 2 |
|   | C5 | — | 20 | 2.50 | N/O |
|   | C6 | — | 30 | 2.50 | N/O |
|   | C7 | — | 40 | 2.50 | N/O |
|   | C8 | — | 50 | 2.50 | N/O |
|   | C9 | — | 20 | 1 | N/O |
|   | C10 | — | 30 | 1 | N/O |
|   | C11 | — | 40 | 1 | N/O |
|   | C12 | — | 50 | 1 | N/O |
| D | D1 | Isooctane | 30 | 2.5 | N/O |

N/O = not observed

It is apparent from this table that the polymer particles are of very small size.

STABILITY OF SUSPENSION

A test tube 150 mm high and 14 mm in diameter is filled to a level of 128 mm with suspension. It is then allowed to stand at 22° C., and the height of the suspension is determined after 1 and 5 days.

Tests are run on the suspensions prepared during the tests C5, C6, C7, C8, C9, C10, C11 and C12. The results are given in table 2 which follows.

TABLE 2

| Suspension for test | Height after one day, mm | Height after five days mm |
|---|---|---|
| C5 | 128 | 128 |
| C6 | 128 | 128 |
| C7 | 128 | 128 |
| C8 | 128 | 128 |
| C9 | 128 | 128 |
| C10 | 128 | 128 |
| C11 | 128 | 126 |
| C12 | 114 | 110 |

As may be seen from this table, the suspensions are very stable at 22° C.

The same tests performed at 50° C. and at 0° C. gave the same results. In the case of the test run at 0° C., the suspensions were frozen and then thawed to measure the level of the suspensions, cyclohexane being a solid at 0° C.

The applicants have further found that when decanted the suspensions will readily redisperse.

EXAMPLE 2

This example relates to the coating of films of aluminum and polyethylene by means of the apparatus shown in FIG. 2.

Films of aluminum and of high-density polyethylene 50 microns thick are used. The polyethylene is the polyethylene A of example 1.

These films are coated with the suspensions prepared in tests C1, C2, C3, C4 and D1 of example 1.

The thickness of the layer of polymer deposited on the film is then measured.

The results are given in table 3 which follows.

TABLE 3

| Test No. | Film used | Suspension used (suspension from test) | Thickness of polymer layer, microns |
|---|---|---|---|
| C110 | Aluminum | C1 | <2 |
| C210 | | C2 | <2 |
| C310 | | C3 | <2 |
| C410 | | C4 | <2 |
| C120 | Polyethylene | C1 | <2 |
| C220 | | C2 | <2 |
| C320 | | C3 | <2 |
| C420 | | C4 | <2 |
| D110 | Aluminum | D1 | <2 |

It is apparent from this table that the layer of polymer deposited is thin.

EXAMPLE 3

This example relates to the use of the polymer-coated supports prepared in example 2 in the production of aluminum/polyethylene and aluminum/polypropylene composites.

The films coated with the graft polymers obtained in example 2 are calendered at 200° C. between two cylinders with a film 50μ thick which is a film of polyethylene A of example 1 in the case of the films of tests C110, C210, C310 and C410;

an aluminum film in the case of the films of tests C120, C220, C320 and C420; and a film of polypropylene identical with polypropylene D of example 1 but containing no acrylic acid in the case of the film of test D110.

During calendering the layer of polymer with which the film is covered is fused.

Bond tests of the peeling type are then performed on the composites so produced. These tests consist of measuring the bond strength of the films of polyethylene or polypropylene and aluminum while they are subjected to opposed pulling forces, the composite being maintained perpendicular to the forces acting on it.

The peeling bond strength is measured, that is to say, the average force per unit length of test piece necessary to cause delamination of the two films when they are moved apart at a uniform rate of 120 mm/min.

Table 4 which follows gives the results obtained with the composites produced by the use of the supports prepared in example 2.

TABLE 4

| Composite obtained with coated support from test | Coated support calendered with a 50μ film of | Bond strength, gf/mm |
|---|---|---|
| C110 | Polyethylene | 550 |
| C210 | — | 750 |
| C310 | — | 620 |
| C410 | — | 480 |
| C120 | Aluminum | 430 |
| C220 | — | 440 |
| C320 | — | 350 |
| C420 | — | 290 |
| D110 | Polypropylene | 500 |

By comparison, with a 50μ aluminum film/50μ graft-polyethylene film composite the values are comprised between 400 and 800 gf/mm. The values obtained with the composites which have a graft-polyethylene film of only 2 microns thus are substantially the same as those obtained with composites have a 50μ graft-polyethylene film. This points up the advantages of the process of the invention, which permits a saving of graft polyethylene, which is more expensive than ungrafted polyethylene.

No example is given for comparison with an aluminum-film/graft-polypropylene film composite since, as has been pointed out earlier, graft-polypropylene films have not been successfully prepared up to now; however, the result will be as good as with polyethylene.

We claim:

1. In a process for coating a support with a polymer layer comprising:
   (a) preparation of a suspension comprising polymer particles in an organic liquid,
   (b) coating of the support with said polymer suspension, and
   (c) the elimination of the organic liquid by heating to a sufficient temperature to drive off the organic liquid;
   the improvement in said process to form a layer in the neighborhood of about 1 micron comprising preparing the polymer suspension by quenching to effect a rapid cooling of a solution of said polymer at a concentration and to a temperature effective to precipitate the polymer to form a suspension having an average particle size of less than 8 microns.

2. Process in accordance with claim 1, which comprises after said elimination step the further step of heating to a sufficient temperature to fuse the polymer to obtain a continuous layer of said polymer on the support.

3. Process in accordance with claim 1, wherein said polymer is a homopolymer of ethylene.

4. Process in accordance with claim 2, wherein said polymer is a homopolymer of ethylene.

5. Process in accordance with claim 1, wherein said polymer is a graft copolymer of an unsaturated monoethylenic carboxylic acid on polyethylene.

6. Process in accordance with claim 2, wherein said polymer is a graft copolymer of an unsaturated monoethylenic carboxylic acid on polyethylene.

7. Process in accordance with claim 5, wherein said unsaturated monoethylenic carboxylic acid is acrylic acid.

8. Process in accordance with claim 6, wherein said unsaturated monoethylenic carboxylic acid is acrylic acid.

9. Process in accordance with claim 3, 4, 5, 6, 7 or 8, wherein the concentration of the polymer in the suspension is less than 8 wt. %.

10. Process in accordance with claim 3, 4, 5, 6, 7 or 8, wherein the concentration of the polymer in the suspension is less than 5 wt. %.

11. Process in accordance with claim 9, wherein the particle size of the polymer, measured in the dry state, contained in the suspension is under 8 microns.

12. Process in accordance with claim 11, wherein the polymer suspension is obtained by quenching the polymer solution to a temperature of 50° C. or less.

13. Process in accordance with claim 1, wherein said polymer is a graft copolymer of an unsaturated monoethylenic carboxylic acid on polypropylene.

14. Process in accordance with claim 2, wherein said polymer is a graft copolymer of an unsaturated monoethylenic carboxylic acid on polypropylene.

15. Process in accordance with claim 13, wherein the unsaturated monoethylenic carboxylic acid is acrylic acid.

16. Process in accordance with claim 14, wherein the unsaturated monoethylenic carboxylic acid is acrylic acid.

17. Process in accordance with claim 15, wherein the concentration of the polymer in the suspension is less than 5 wt. %.

18. Process in accordance with claim 11, wherein the support is selected from the group consisting of the metals, paper, glass, polymers and fabrics.

19. Process in accordance with claim 18, wherein the support is selected from the group consisting of films of aluminum, polyethylene or polypropylene.

20. A support coated with a layer of polymer obtained by the process in accordance with claims 1 or 2.

21. Process in accordance with claim 16, wherein the concentration of the polymer in the suspension is less than 5 wt. %.

22. Process in accordance with claim 13, 14, 15, 16, 17 or 21, wherein the polymer suspension is obtained by quenching a polymer solution to a temperature of 40° C. or less.

23. Process in accordance with claim 22, wherein the support is selected from the group consisting of the metals, paper, glass, polymers and fabrics.

24. Process in accordance with claim 23, wherein the support is selected from the group consisting of films of aluminum, polyethylene or polypropylene.

25. Process in accordance with claim 1, wherein said solution of polymer is prepared prior to quenching by dissolving melted polymer in said organic liquid.

26. Process in accordance with claim 2, wherein said solution of polymer is prepared prior to quenching by dissolving melted polymer in said organic liquid.

27. A method of making a composite film formed of a polyethylene or polypropylene film and of an aluminum film comprising:
 I. coating a support film of aluminum, polyethylene, or polypropylene with a graft copolymer layer by the steps comprising:
  (a) preparing a suspension comprising particles of a graft copolymer, obtained by polymerization of ethylene or propylene and grafting with acrylic acid, by quenching to effect a rapid cooling of a solution of said copolymer in an organic liquid at a concentration and to a temperature effective to precipitate the copolymer as a suspension having an average particle size of less than 8 microns,
  (b) coating the support film with said copolymer suspension, and
  (c) eliminating the organic liquid from the resulting coating by heating to a sufficient temperature to drive off the organic liquid and give a layer having a thickness in the neighborhood of about 1 micron; and
 II. bonding the resulting coated support film to a second film of aluminum, polyethylene or polypropylene with heat.

28. The method according to claim 27, wherein during the bonding step the graft copolymer is heated sufficiently to fuse.

29. The method in accordance with claim 28, wherein the acrylic acid content of the graft copolymer is 0.5 wt. %.

30. A film composite made by a method in accordance with claims 29, 27, or 28.

* * * * *